US00RE49553E

(19) United States
(12) Reissued Patent
Heath

(10) Patent Number: US RE49,553 E
(45) Date of Reissued Patent: Jun. 20, 2023

(54) FOOD PRODUCT

(71) Applicant: Mars, Incorporated, McLean, VA (US)

(72) Inventor: Guy Heath, Batley (GB)

(73) Assignee: Mars, Incorporated, McLean, VA (US)

(21) Appl. No.: 29/793,287

(22) Filed: Dec. 14, 2021

Related U.S. Patent Documents

Reissue of:
(64) Patent No.: Des. 822,315
Issued: Jul. 10, 2018
Appl. No.: 29/587,631
Filed: Dec. 14, 2016

(51) LOC (14) Cl. ..... 01-01
(52) U.S. Cl.
USPC ..... D1/122
(58) Field of Classification Search
USPC ..... D1/100–130, 199; D11/40, 43, 79; D24/101–104; D21/484, 499, 503, 622, D21/756; D23/393, 422; D25/119, 122
CPC ..... A21D 13/0029; A21D 13/0074; A21D 13/0022; A21D 13/0006; A23L 1/1641; A23L 1/005
See application file for complete search history.

(56) References Cited

U.S. PATENT DOCUMENTS 57,890 A * 9/1866 Gilson ..... C10L 5/36 44/530
D96,909 S * 9/1935 Huld ..... D7/300.2
D203,807 S * 2/1966 Pellegrino ..... D1/114
3,386,590 A * 6/1968 Gretz ..... F21V 35/00 211/182

(Continued)

FOREIGN PATENT DOCUMENTS

DE 9509757 8/1996
EP 000206214-0001 7/2004

(Continued)

OTHER PUBLICATIONS

"Triangle Penne Pasta 17.6 Oz." Magnifico Food., Jun. 22, 2019 [online], [retrieved on Feb. 19, 2023]. Retrieved from the Internet <URL: https://www.magnificofood.com/products/artisanal-penne-a-triangolo-17-6-oz>.*

(Continued)

*Primary Examiner* — Darlington Ly

(57) CLAIM

The ornamental design for a food product, as shown and described.

DESCRIPTION

FIG. 1 is a front right perspective view of a food product showing our new design;
FIG. 2 is a front elevation view of the food product shown in FIG. 1;
FIG. 3 is a rear elevation view of the food product shown in FIG. 1;
FIG. 4 is a right side elevation view of the food product shown in FIG. 1;
FIG. 5 is a left side elevation view of the food product shown in FIG. 1;
FIG. 6 is a top plan view of the food product shown in FIG. 1; and,
FIG. 7 is a bottom plan view of the food product shown in FIG. 1.
The broken lines shown in FIGS. 1-7 illustrate portions of the food product that form no part of the claimed design.

1 Claim, 3 Drawing Sheets

Figure 1:
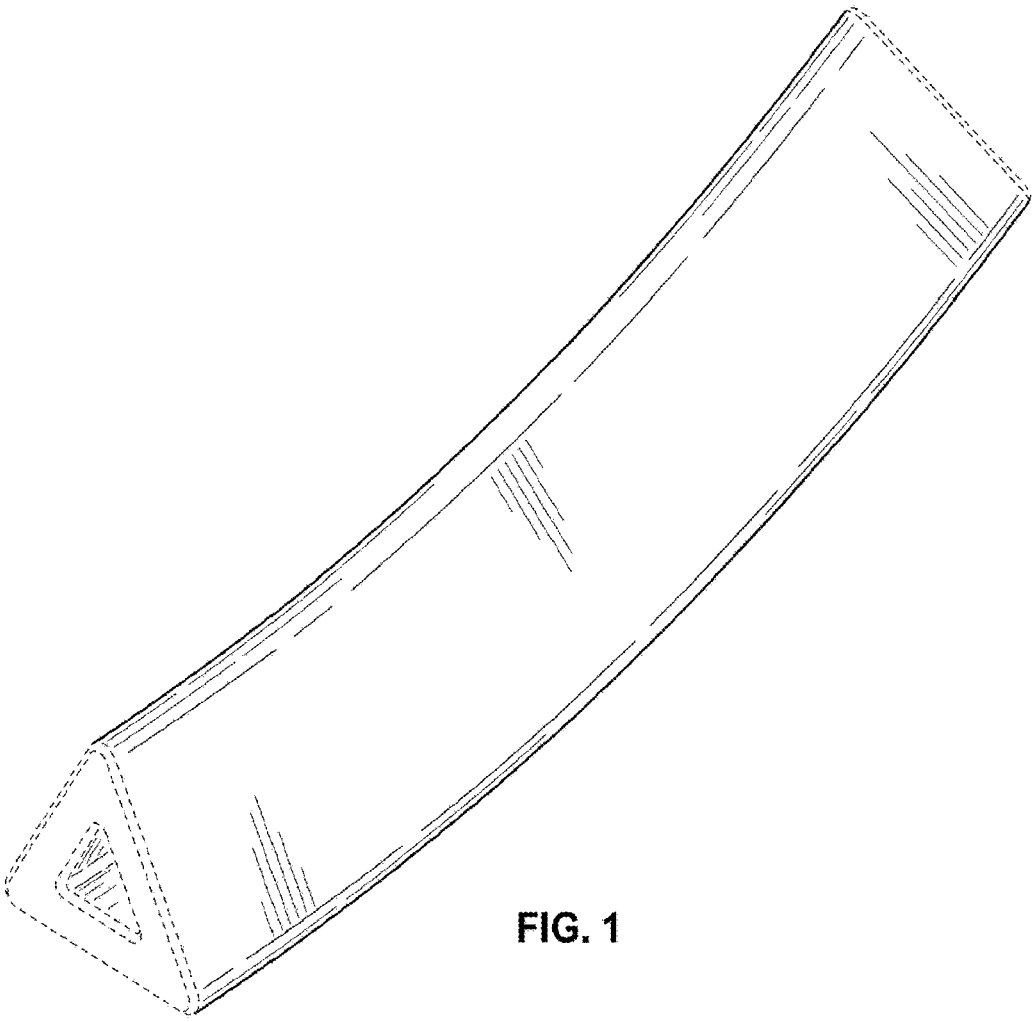
Figure 2:
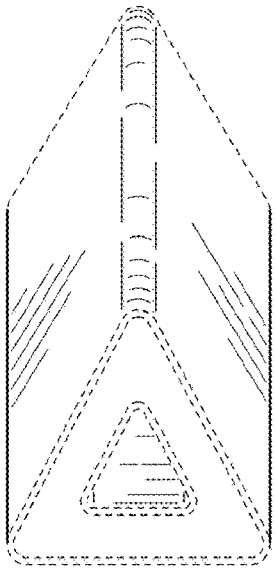
Figure 3:
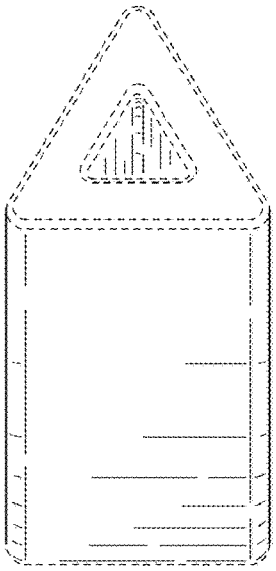
Figure 4:
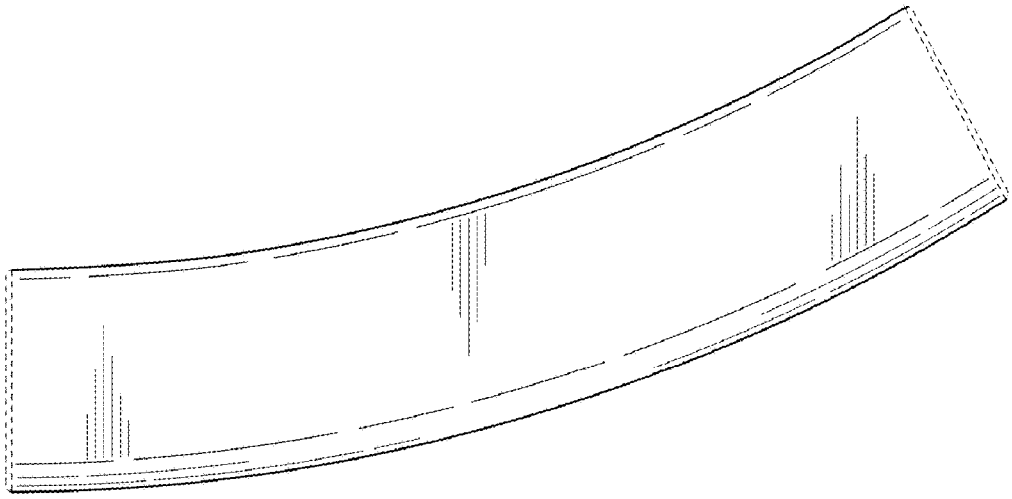
Figure 5:
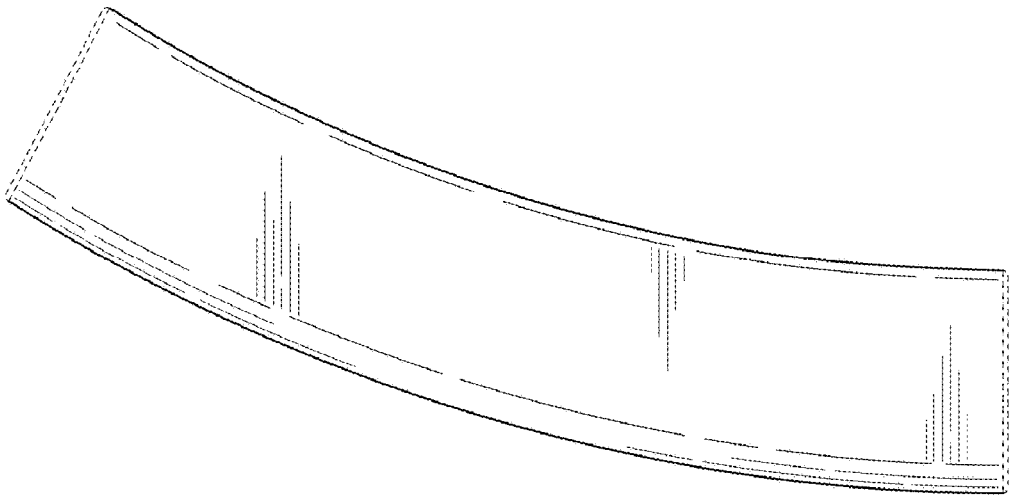
Figure 6:
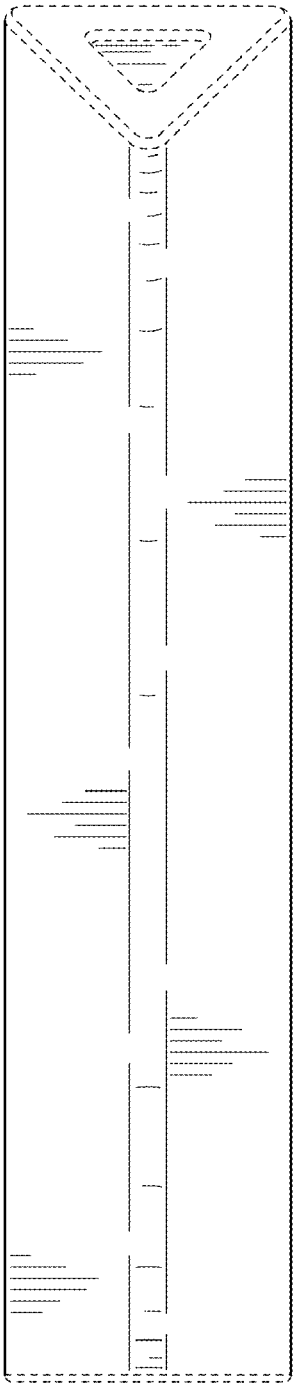
Figure 7:
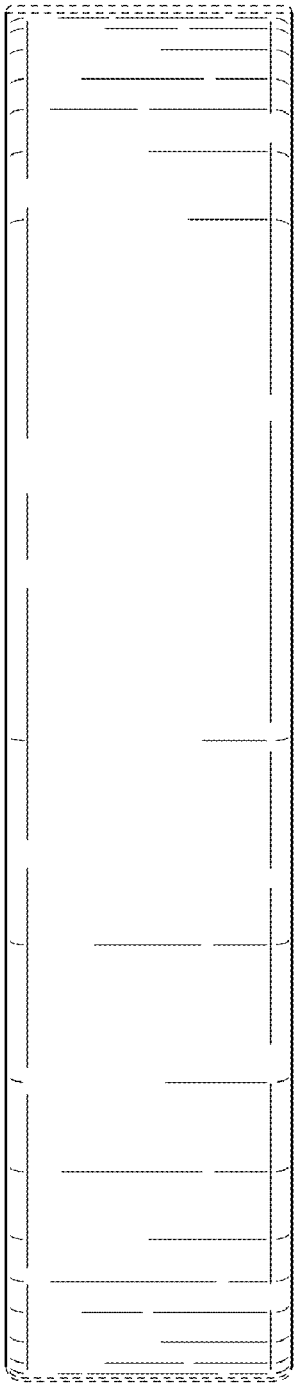

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 3,917,194 | A | * | 11/1975 | Muller | B64C 3/40 244/46 |
| D249,723 | S | * | 9/1978 | Cosman | D21/386 |
| D249,724 | S | * | 9/1978 | Cosman | D21/386 |
| 4,849,266 | A | * | 7/1989 | Dwivedi | B22D 19/00 164/98 |
| D392,435 | S | * | 3/1998 | Mocking | D1/120 |
| D418,881 | S | * | 1/2000 | Cousins | D21/681 |
| D473,348 | S | * | 4/2003 | Lang | D1/199 |
| D485,046 | S | * | 1/2004 | Hague | 426/104 |
| D485,661 | S | * | 1/2004 | Harris | A01K 15/026 D1/122 |
| D500,579 | S | | 1/2005 | Tansey et al. | |
| D503,645 | S | * | 4/2005 | Wirth | D10/114.9 |
| D516,276 | S | * | 3/2006 | Unlu | D1/199 |
| D532,583 | S | * | 11/2006 | Townsend | D1/122 |
| D537,892 | S | * | 3/2007 | Moses | D21/679 |
| D558,444 | S | * | 1/2008 | Ma | D3/6 |
| D576,721 | S | * | 9/2008 | Nishio | D23/393 |
| D585,177 | S | * | 1/2009 | Wylie | D1/125 |
| D586,454 | S | * | 2/2009 | Nishio | D23/393 |
| D686,192 | S | * | 7/2013 | Widner | D14/212 |
| D708,417 | S | * | 7/2014 | Allen | D1/106 |
| D726,477 | S | * | 4/2015 | Buck | D7/300.2 |
| D746,541 | S | * | 1/2016 | Sambashivan | D1/120 |
| D771,054 | S | * | 11/2016 | King | D14/447 |
| D802,880 | S | * | 11/2017 | Mathew | D1/128 |
| D803,510 | S | * | 11/2017 | Heath | D1/125 |
| D822,315 | S | * | 7/2018 | Heath | D1/122 |
| D853,080 | S | * | 7/2019 | Albuja Cuadrado | D1/125 |
| D884,308 | S | * | 5/2020 | Brown | D1/122 |
| D903,228 | S | * | 12/2020 | Monaghan | D1/122 |
| D903,229 | S | * | 12/2020 | Stevens | D1/122 |
| D969,449 | S | * | 11/2022 | Jacko | D1/125 |
| D973,999 | S | * | 1/2023 | McCann | D1/125 |
| 2005/0151407 | A1 | * | 7/2005 | Tai | A47C 1/143 297/344.1 |

FOREIGN PATENT DOCUMENTS

| | | |
|---|---|---|
| JP | 0001223959 | 10/2004 |
| JP | D1224610 | 10/2004 |
| JP | D1224774 | 10/2004 |
| KR | 300470351 | 11/2007 |
| RO | DM076390 | 2/2012 |
| WO | 8806851 A1 | 9/1988 |

OTHER PUBLICATIONS

"Penne triangolo." Paniere D'Italia., Dec. 9, 2020 [online], [retrieved on Feb. 19, 2023]. Retrieved from the Internet <URL: https://paniereditalia.it/prodotto/penne-triangolo/>.*

Vantschip, Nina. "Dog Bones." Doodle Kisses. Nov. 11, 2009. Web. Dec. 29, 2017. <http://www.doodlekisses.com/forum/topics/dog-bones>.*

"Triangle Noodle Detergent Speckles." Sichuan Faith and Fortune Trading Co., Ltd. Mar. 3, 2014. Web. Dec. 29, 2017. <https://scdxst.en.ec21.com/Triangle _Noodle_Detergent_Speckles--8785251_8909349.html>.*

"Pencil Grip 101." The Anonymous OT. Apr. 19, 2013. Web. Dec. 29, 2017. <https://theanonymousot.com/2013/04/19/pencil-grip-101/>.*

"Those that Wait." Meridian Financial Partners. Apr. 3, 2016. Web. Dec. 29, 2017. <https://meridianfinancialpartners.com/2016/08/03/those-that-wait/>.*

Petsmart, accessed Aug. 27, 2017, 1999-2008, Web Page, 2 pgs.

Summer Jun. 2005 The Unbeatable Selection and Value Your Business Needs!, pp. 207.

"More than Slightly Obsessed Hi I'm Skinny Sticks Review", Published: Aug. 17, 2013, Retrieved: Nov. 21, 2017, from: http://cleaneatingveggiegirl.com/2013108/17/more-than-slightly-obsessed-hi-im-skinny-sticks-review/.

* cited by examiner